Patented Sept. 27, 1949

2,483,381

UNITED STATES PATENT OFFICE 2,483,381

β-DIHYDRO-IONYLAMINE AND THE ACID ADDITION SALTS THEREOF

Moses Wolf Goldberg, Upper Montclair, and Sidney Teitel, Nutley, N. J., assignors to Hoffmann-La Roche Inc., Nutley, N. J., a corporation of New Jersey No Drawing. Application March 9, 1948, Serial No. 13,953

4 Claims. (Cl. 260—501)

The present invention relates to a new amine and its acid addition salts, and to a process for preparing the new amine.

More particularly the invention relates to the new compound 1-methyl-3-(2,6,6-trimethyl-1-cyclohexen-1-yl)-propylamine and its salts with inorganic and organic acids, for example, the hydrochloric acid, the hydrobromic acid and the benzoic acid salts. The new amine and its salts serve as valuable intermediates for the production of new compounds, in particular for the production of new insoluble penicillin salts of high therapeutic activity, which form the subject of our application Serial No. 13,954, filed March 9, 1948, now U. S. Patent 2,843,382.

The structure of the new amine is related to that of dihydro-β-ionone, and can be represented by the following formula:

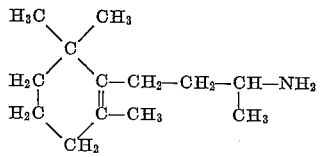

The new amine can be prepared most advantageously and in excellent yield by direct catalytic hydrogenation of β-ionone in the presence of ammonia and a hydrogenation catalyst, such as a nickel, platinum or palladium catalyst. Of the two double bonds present in β-ionone, the one adjacent to the keto-group is thus reduced and the keto-group converted into an amino-group. However, the new amine can also be obtained in equally good yields in two steps, by first reducing β-ionone to the known dihydro-β-ionone, for example, by catalytic hydrogenation, and then reacting the latter with hydrogen and ammonia in the presence of a hydrogenation catalyst, in the same way as described for β-ionone.

The following examples will serve to illustrate the invention:

Example 1

Four hundred grams of β-ionone, dissolved in 900 cc. of a 17 per cent solution of ammonia in methanol, are catalytically hydrogenated in the presence of about 30 grams of Raney nickel at 150° C. and 2,000 pounds per square inch hydrogen pressure for about 24 hours. The catalyst is then filtered off and the methanol solution concentrated. The residual liquid is fractionated by vacuum distillation at 5 mm. mercury pressure. A yield of at least 335 grams of 1-methyl-3-(2,6,6-trimethyl-1-cyclohexen-1-yl)-propylamine is obtained. The boiling point of the new amine is 106–108° C. at 5 mm. and 125–126° C. at 18 mm.

In carrying out the preparation of the new amine, the hydrogenation temperature and pressure are not critical and can therefore be varied within a wide range, and instead of methanol, other solvents such as ethanol, isopropanol, ethyl acetate and the like, can also be employed.

1-methyl-3-(2,6,6-trimethyl-1-cyclohexen-1-yl)-propylamine can be converted to its hydrochloride, for example, by adding aqueous hydrochloric acid directly to the amine suspended in water. The precipitated salt, after recrystallization from water, melts with decomposition at 225–227° C. The hydrobromide may be similarly prepared and melts with decomposition at 222–223° C. after recrystallization from acetonitrile. The benzoate may be prepared by neutralizing an alcoholic solution of the amine with an alcoholic solution of benzoic acid. The oil obtained after removal of the alcohol is crystallized from ether-acetonitrile. The benzoate melts at 91–92° C.

Example 2

Twenty grams of dihydro-β-ionone dissolved in 100 cc. of ethanol saturated with ammonia are catalytically hydrogenated in the presence of 4 grams of Raney nickel at 75° C. and 2,000 pounds per square inch hydrogen pressure for about 24 hours. The reaction mixture is worked up as in the previous example, yielding 16 grams of 1-methyl-3-(2,6,6-trimethyl-1-cyclohexen-1-yl) propylamine boiling at 108–110° C. at 7 mm. and identical with the product described in Example 1.

We claim:

1. A compound selected from the group consisting of 1-methyl-3-(2,6,6-trimethyl-1-cyclohexene-1-yl)-propylamine and the acid addition salts thereof.

2. 1-methyl-3-(2,6,6-trimethyl-1-cyclohexen-1-yl)-propylamine hydrochloride.

3. 1-methyl-3-(2,6,6-trimethyl-1-cyclohexen-1-yl)-propylamine hydrobromide.

4. 1-methyl-3-(2,6,6-trimethyl-1-cyclohexen-1-yl)-propylamine benzoate.

MOSES WOLF GOLDBERG.
SIDNEY TEITEL.

REFERENCES CITED

The following references are of record in the file of this patent:

UNITED STATES PATENTS

| Number | Name | Date |
|--------|------|------|
| 714,931 | Merling | Dec. 2, 1902 |
| 1,989,325 | Lommel et al. | Jan. 29, 1935 |
| 2,045,574 | Adkins | June 30, 1936 |
| 2,278,123 | Heyn | Mar. 31, 1942 |
| 2,367,546 | Ullyot | Jan. 16, 1945 |

OTHER REFERENCES

Gunn et al., "J. Physiol.," (1940), vol. 97, page 455.